United States Patent
Kremer

(10) Patent No.: US 6,742,763 B2
(45) Date of Patent: Jun. 1, 2004

(54) LINEAR SPRING-LOADED ACTUATOR FOR A VALVE

(75) Inventor: Paul Kremer, Walferdange (LU)

(73) Assignee: Luxembourg Patent Company S.A. (LU)

(*) Notice: Subject to any disclaimer, the term of this patent is extended or adjusted under 35 U.S.C. 154(b) by 117 days.

(21) Appl. No.: 10/148,638

(22) PCT Filed: Dec. 13, 2000

(86) PCT No.: PCT/EP00/12663
§ 371 (c)(1),
(2), (4) Date: Jul. 25, 2002

(87) PCT Pub. No.: WO01/44703
PCT Pub. Date: Jun. 21, 2001

(65) Prior Publication Data
US 2003/0020035 A1 Jan. 30, 2003

(30) Foreign Application Priority Data
Dec. 14, 1999 (LU) .................................................. 90487

(51) Int. Cl.$^7$ ............................................. F16K 35/00
(52) U.S. Cl. ...................................... 251/112; 137/383
(58) Field of Search ................... 251/89–89.5, 111–113; 137/383–384.8, 385

(56) References Cited
U.S. PATENT DOCUMENTS

| | | | |
|---|---|---|---|
| 4,171,820 A | | 10/1979 | Klancnik |
| 4,557,153 A | | 12/1985 | Ulbing |
| 4,941,504 A | * | 7/1990 | Beauvir ........................ 137/524 |
| 5,067,520 A | * | 11/1991 | Kremer et al. ............ 137/614.2 |
| 5,203,477 A | * | 4/1993 | Lo ........................... 222/153.01 |
| 5,607,084 A | * | 3/1997 | George ................... 222/153.03 |
| 5,791,371 A | * | 8/1998 | Kemp, II ...................... 137/383 |

FOREIGN PATENT DOCUMENTS

| | | |
|---|---|---|
| EP | 0 309 081 | 3/1989 |
| GB | 1 269 576 | 4/1972 |

* cited by examiner

Primary Examiner—Paul J. Hirsch
(74) Attorney, Agent, or Firm—Nath & Associates PLLC; Gary M. Nath

(57) ABSTRACT

A linear spring-loaded actuator (10) for a valve (12) comprises a housing (14) and an actuating spindle (16) slidably supported in the housing (14). A cap (22) is associated with the housing (14). Spring means (36), arranged in the housing (14), bear on the cap (22) and the actuating spindle (16), so as to exert a spring force on the actuating spindle (16). A thread (26) on the housing (14) cooperates with a thread (24', 24") on the cap (22) for screwing the cap (22) on the housing (14) so as to preload the spring means (36) in the housing (14). At least one lock means (40) is associated with one of the threads (24', 24") and is capable of deforming this thread (24, 24") so as to lock it in any position on the cooperating thread (26).

18 Claims, 3 Drawing Sheets

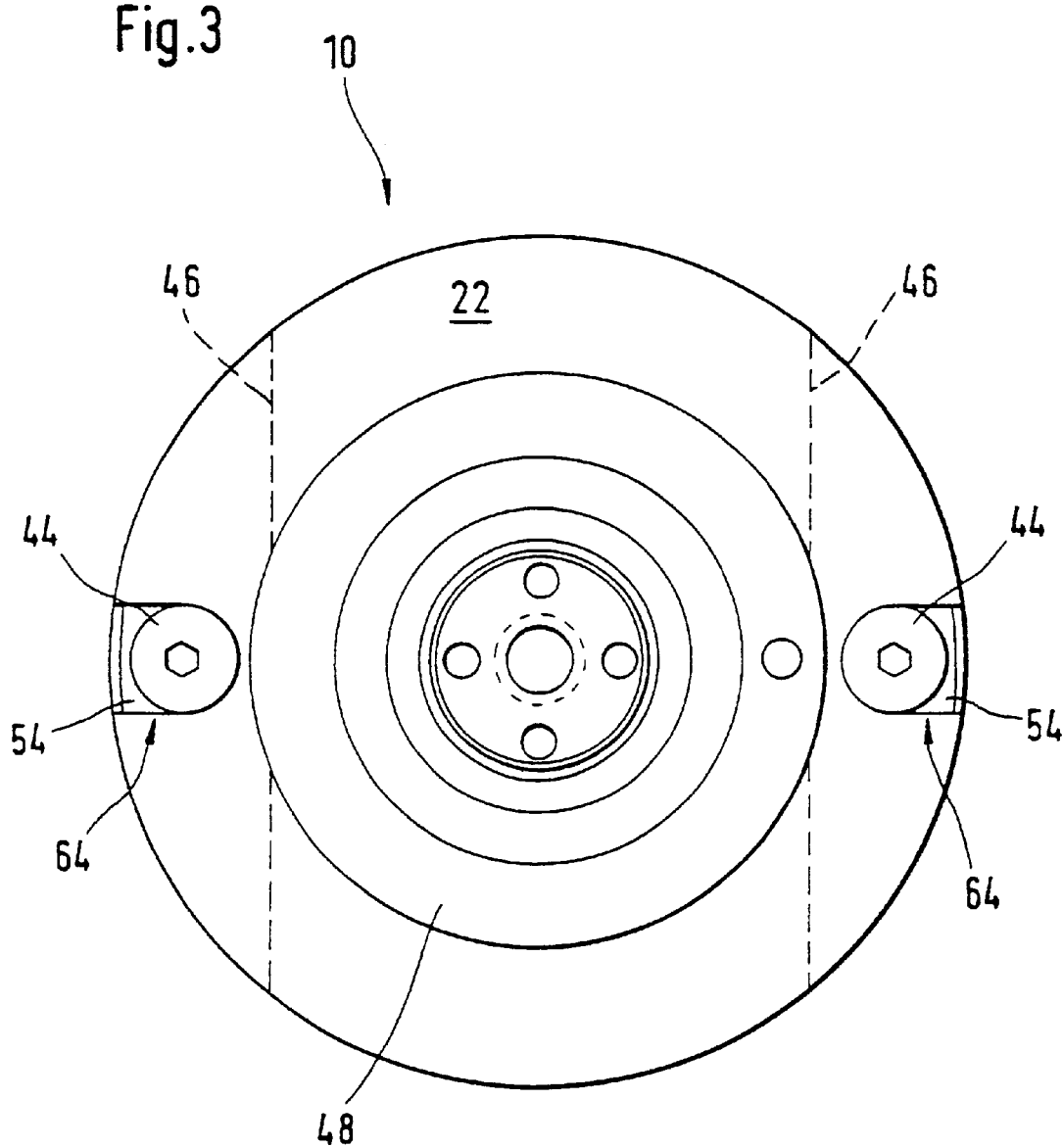

LINEAR SPRING-LOADED ACTUATOR FOR A VALVE

FIELD OF THE INVENTION

The present invention relates to a linear spring-loaded actuator for a valve.

BACKGROUND OF THE INVENTION

Such a linear spring-loaded actuator comprises a housing in which an actuating spindle is slidably mounted. A cap screwed on a housing thread permits to preload a spring means arranged in the housing. This spring means comprises for example a cylindrical helical compression spring or, more often, a stack of Belleville spring washers. It bears on the cap and exerts a spring force on the spindle. The cap is for example screwed in the housing until it bears on a shoulder arranged below the housing thread. It is then fixed with a given tightening moment, thus ensuring the immobilization of the cap in the housing. A linear spring-loaded pneumatic actuator of this type is e.g. disclosed in EP-A-0 039 081.

The spring force of the actuator will have to be adjusted, depending for example on the valve specifications. This is generally done by inserting more or less washers between the cap and the spring means, so as to pre-load the spring means more or less. However, such an adjustment of the spring force with washers is rather complex and laborious. Indeed, the cap has to be removed, one or more washers have to be added or to be removed, and the cap has to be screwed in the housing and fastened with a given tightening moment. Moreover, washers do not allow to adjust the spring force with precision.

OBJECT OF THE INVENTION

Consequently, there is a strong need for a linear spring-loaded actuator, wherein the spring force may be easily and precisely adjusted. According to the invention, this is achieved by a linear spring-loaded actuator according to claim 1.

SUMMARY OF THE INVENTION

In accordance with the invention a linear spring-loaded actuator for a valve comprises a housing and an actuating spindle slidably supported in the housing. A cap is associated with the housing. Spring means, arranged in the housing, bear on the cap and the actuating spindle, so as to exert a spring force on the actuating spindle. A thread on the housing cooperates with a thread on the cap for screwing the cap on the housing so as to preload the spring means in the housing. According to an important aspect of the invention, at least one lock means, associated with one of the threads, is capable of deforming this thread so as to lock it in any position on the cooperating thread. Hence, the presence of a shoulder is not required anymore to lock the two cooperating threads. In other words, the cap must not be screwed up to the depth of a shoulder to be immobilized in the housing. Indeed, thanks to the lock means, the thread associated thereto may be locked in any position on the cooperating thread. The cap may thereby be immobilized in any position on the housing thread. Varying the position of the cap on the housing thread allows to compress more or less the spring means in said housing. Hence, the spring force can easily be adjusted, simply by screwing in or off the cap on the housing thread. Moreover, the spring force may be adjusted with precision as the pre-load can be continuously adjusted. Once the desired spring force is obtained, the lock means is operated and the cap is immobilized.

Lock means may be associated with the housing thread or the cap thread or with both. In order to obtain a compact actuator it is however preferable to associate the lock means with the cap thread only. Such a cap is then preferably equipped with two diametrically opposed lock means associated with the cap thread.

A preferred lock means comprises a slot penetrating laterally in one of the threads so as to locally split the thread in two thread halves. In other words, the slot divides a first section from a second section. The first section has the first thread half thereon and the second section has said second thread half thereon. A screw is associated with the slot so as to be capable of locally drawing together or separating said two thread halves. Therefore, in any position of the cooperating threads, the thread halves may be pressed against the cooperating thread to cause their locking. In a first embodiment, the screw has a screw head and a screw barrel with a threaded foot end. The screw head bears on a first of the two sections, and this first section and the slot are traversed by the screw barrel. The second section has a threaded bore in which the threaded foot end is received, so that it is possible to draw together the two sections by screwing in said screw. In a second embodiment, the screw has a threaded screw barrel and a foot end. A first of the two sections has a threaded through bore. The threaded screw barrel is screwed in the threaded through bore and traverses the slot. The foot end bears on the second section, so that it is possible to separate the two sections by screwing in the screw.

Preferably, the spring means comprises at least one Belleville spring washer.

A fluid operated piston assembly may be housed in the housing to overcome the spring force exerted by the spring means in order to actuate the actuating spindle.

BRIEF DESCRIPTION OF THE DRAWINGS

The present invention will now be described, by way of example, with reference to the accompanying drawings, in which.

FIG. 3: is a top view of the linear spring-loaded actuator of FIG. 1.

DETAILED DESCRIPTION OF A PREFERRED EMBODIMENT

Figure 1:
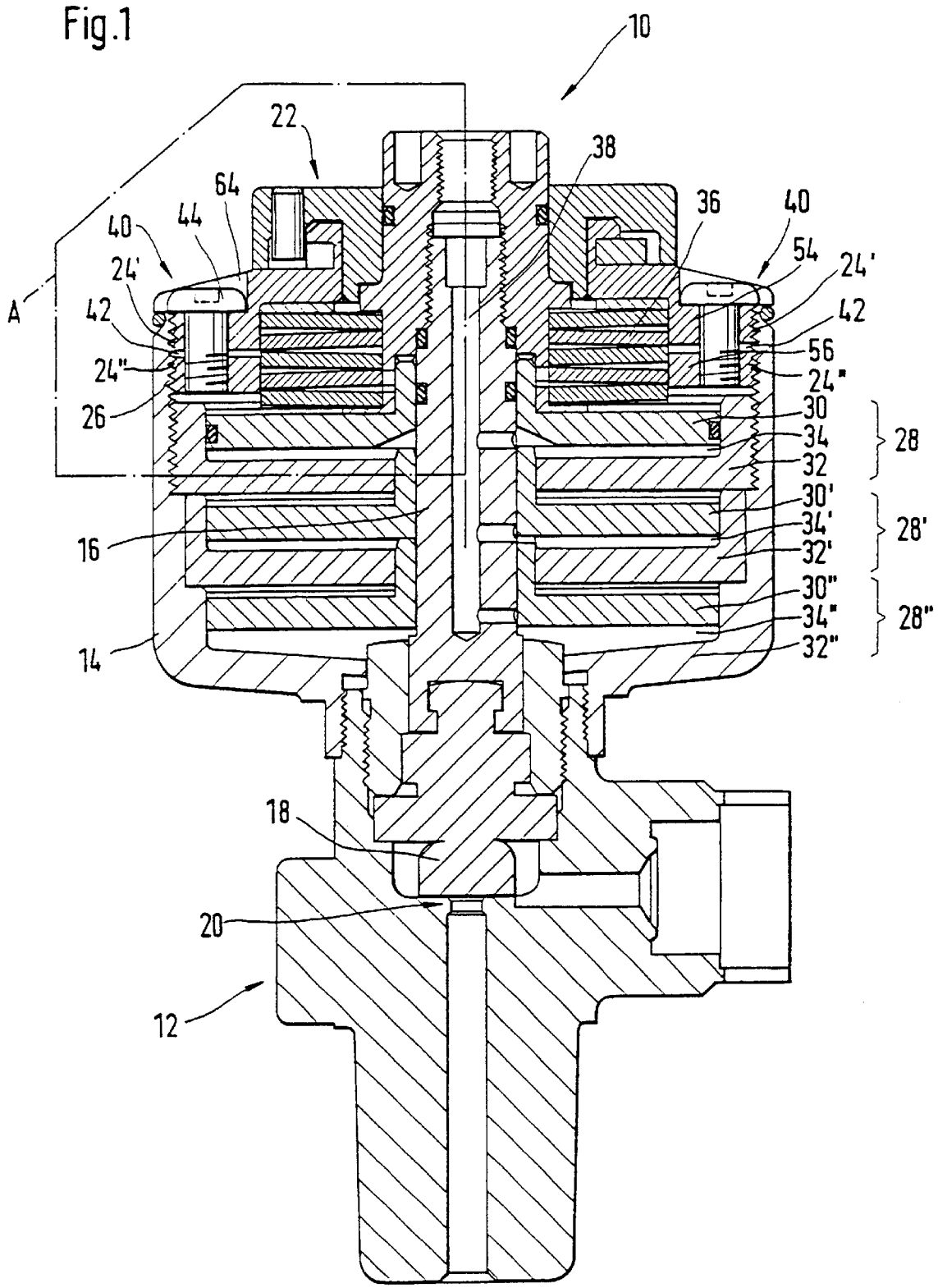
FIG. 1: is a longitudinal cross-sectional view of a linear spring-loaded actuator in accordance with the invention.

FIG. 1 shows a longitudinal cross-sectional view of a linear spring-loaded actuator 10 in accordance with the present invention. This actuator 10 is connected to a valve 12. It comprises a housing 14 and an actuating spindle 16 slidably supported in the housing 14. The actuating spindle 16 enables actuation of a valve plug 18 so as to open and close a valve seat 20 inside the valve 12. A cap 22 is associated with the housing 14, the cap 22 and the housing 14 having co-operating threads, i.e. a cap thread 24', 24" and a housing thread 26, for screwing the cap 22 in the housing 14. Three piston assemblies 28, 28' and 28" are stacked inside the housing 14, a first piston assembly 28 being located near the cap 22. Each piston assembly 28, 28' and 28" has a piston 30, 30' and 30" slidable in the housing 14 and a partition 32, 32' and 32" fixed in the housing 14, the partition 32" of the third piston assembly 28", near the valve 12, being the wall of the housing 14. The space between the piston 30, 30' and 30" and the partition 32, 32' and 32" of each piston assembly 28, 28' and 28" defines a pressure chamber 34, 34' and 34". The pistons 30, 30' and 30" are spaced along the actuating spindle 16 and integral with it. Spring means 36, for example a stack of Belleville spring washers, is arranged in the housing 14. The stack of spring washers 36 bears on the cap 22 as well as on the piston 30 of the first piston assembly 28. The cap 22 pre-loads the stack of spring washers 36. Since the piston 30 of the first piston assembly 28 is integral with the actuating spindle 16, the spring force exerted by the stack of Belleville spring washers 36 on this piston 30 is transmitted to the actuating spindle 16. As a consequence, the valve plug 18 is urged against the valve seat 20 and the valve 12 is closed. Path means 38 are arranged in the actuating spindle 16 to permit the introduction of pressurized fluid, as e.g. compressed air, into the pressure chambers 34, 34' and 34". The valve 12 may be opened by introducing the pressurized fluid into the pressure chambers 34, 34' and 34" to exert on the pistons 30, 30' and 30" a pressure force sufficient to overcome the spring force.

Two lock means, generally referred to by reference sign 40, are diametrically opposed in the cap 22. It shall be appreciated that each lock means 40 is associated with the cap thread 24', 24" and is capable of deforming the cap thread 24', 24" so as to lock it in any position on the cooperating thread, i.e. the housing thread 26. This means that the stack of spring washers 36 will be more or less compressed, by screwing in or off the cap 22 on the housing thread 26. Once the desired spring force is obtained, the lock means 40 are operated to immobilize the cap 22.

Figure 2:
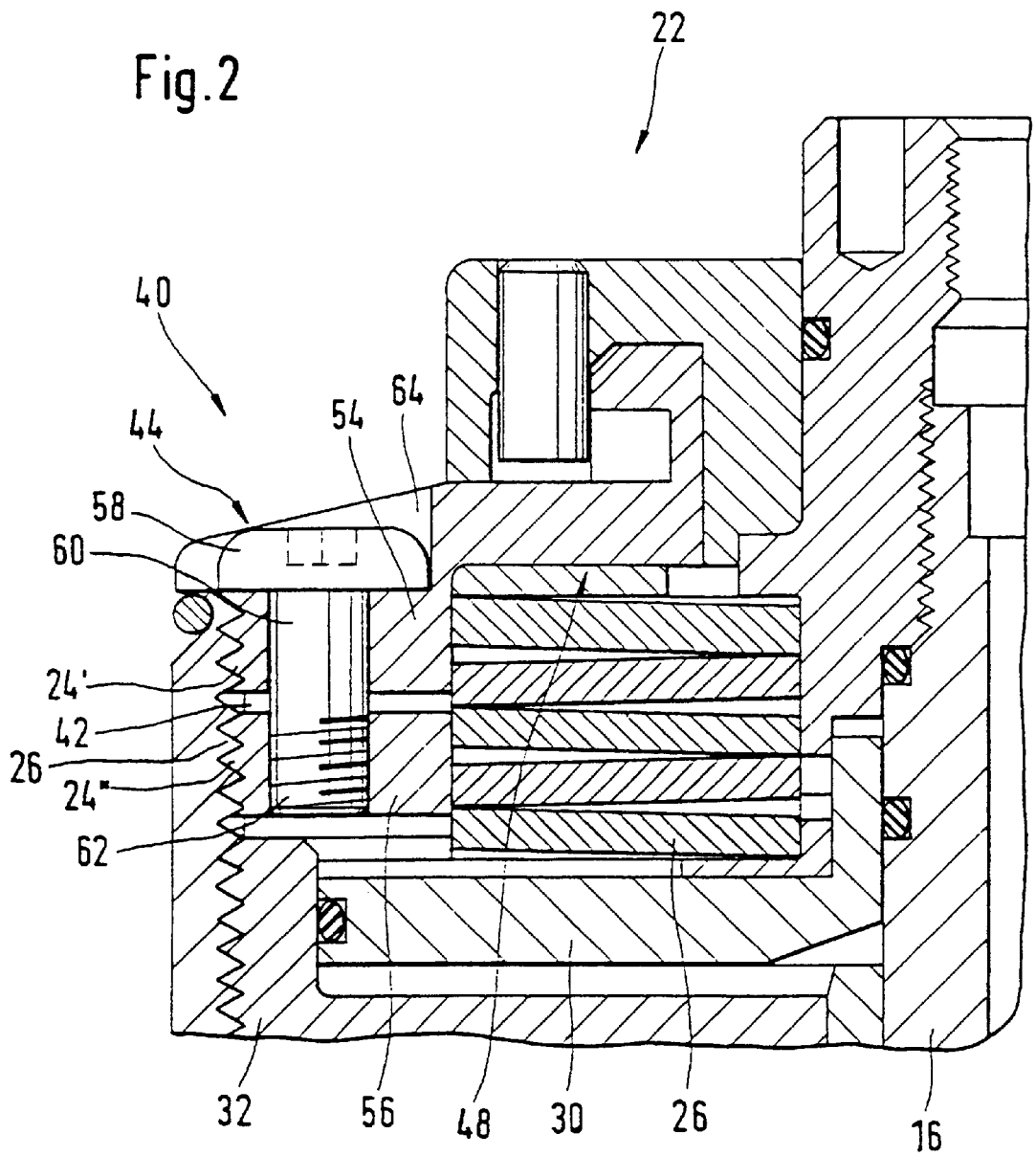
FIG. 2: is a view of detail A of FIG. 1.

As can be seen in FIGS. 2 and 3, each lock means 40 comprises a slot 42 and a screw 44 associated therewith. The slot 42 penetrates laterally in the cap thread 24', 24". The rear part of slot 42, indicated by a dashed line 46 on FIG. 3, is tangential to a cylindrical recess 48 receiving the upper part of the stack of Belleville spring washers 36 in the inner side of the cap 22. The slot 42 locally splits the cap thread 24', 24" in two halves 24' and 24" and divides an upper section 54 from a lower section 56. The upper section 54 has the upper cap thread half 24' thereon and the lower section 56 has the lower cap thread half 24" thereon. The screw 44 has a screw head 58, a screw barrel 60 and a threaded foot end 62. It is arranged perpendicularly to the slot 42 and its screw head 58, which is nested in a recess 64, bears on the upper section 54. The recess 64 provides protection for the screw head 58 and allows its screwing from above. The screw barrel 60 traverses the upper section 54 and the slot 42. The lower section 56 has a threaded bore in which the threaded foot end 62 is screwed. When the screw 44 is screwed in, both sections 54 and 56 are drawn together. As a consequence, the upper and lower cap threads halves 24' respectively 24" lock on the housing thread 26, thus causing the immobilization of the cap 22.

In an other embodiment of a linear spring-loaded actuator of the invention not shown on the Figures, two lock means are similarly associated to the cap thread. In this embodiment, the screw has a threaded screw barrel and a foot end. The upper section has a threaded through bore in which is screwed the threaded screw barrel. The threaded screw barrel traverses the slot and the foot end bears against the lower section. When the screw is screwed in, the distance between the two sections increases, respectively the thickness of the slot increases. The upper and lower cap threads lock on the housing thread and the cap is immobilized.

It remains to be noted that the deformation caused to the cap thread, and possibly the housing thread, when the lock means are operated is generally elastic. Hence, the cap may be relocated at will by the user in order to adjust the spring force. However, the lock means may also be designed so as to cause a plastic deformation of the threads. The cap will then remain immobilized in the housing and the spring force can not be changed by the user. This may be appreciated in the field of linear spring-loaded actuators with safety functions, where the actuator has to be inviolable.

What is claimed is:

1. A linear spring-loaded actuator for a valve, said actuator comprising:

a housing;

an actuating spindle slidably supported in said housing;

a cap associated with said housing;

spring means arranged in said housing, said spring means bearing on said cap and said actuating spindle, so as to exert a spring force on said actuating spindle;

a thread on said housing and a thread on said cap, said threads cooperating for screwing said cap on said housing so as to preload said spring means in said housing; and at least one lock means associated with one of said threads, said lock means being capable of deforming said thread so as to lock it in any position on the cooperating thread.

2. The actuator according to claim 1 wherein said lock means comprises:

a slot penetrating laterally in one of said threads so as to locally split said thread in two thread halves; and a screw associated with said slot so as to be capable of locally drawing to-together or separating said two thread halves.

3. The actuator according to claim 2 wherein:

said slot divides in said cap a first section from a second section, said first section having said first thread half thereon and said second section having said second thread half thereon.

4. The actuator according to claim 3 wherein:

said screw has a screw head and a screw barrel with a threaded foot end;

said screw head bears on a first of said two sections, and said first of said two sections and said slot are traversed by said screw barrel; and said second section has a threaded bore in which said threaded foot end is received, so that it is possible to draw together said two sections by screw-screwing in said screw.

5. The actuator according to claim 3 wherein:

said screw has a threaded screw barrel and a foot end;

a first of said two sections has a threaded through bore;

said threaded screw barrel is screwed in said threaded through bore and traverses said slot; and said foot end bears on the second section, so that it is possible to separate said two sections by screwing in said screw.

6. The actuator according to claim 1, wherein said spring means comprises at least one Belleville spring washer.

7. The actuator according to claim 1, comprising a fluid operated piston assembly in said housing.

8. The actuator according to claim 1, comprising two diametrically opposed lock means associated with said thread on said cap.

9. The actuator according to claim 8 wherein said lock means comprises:
   two slots penetrating laterally in said thread of said cap at two diametrically opposed locations, so as to locally split said thread in two thread halves at each of said two diametrically opposed locations; and
   a screw associated with each of said two slots so as to be capable of locally drawing together or separating said two thread halves.

10. A valve including a linear spring-loaded actuator comprising:
   a housing;
   an actuating spindle slidably supported in said housing;
   a cap associated with said housing;
   spring means arranged in said housing, said spring means bearing on said cap and said actuating spindle, so as to exert a spring force on said actuating spindle;
   a thread on said housing and a thread on said cap, said threads cooperating for screwing said cap on said housing so as to preload said spring means in said housing; and
   at least one lock means associated with one of said threads, said lock means being capable of deforming said thread so as to lock it in any position on the cooperating thread.

11. The valve according to claim 10 wherein said lock means comprises:
   a slot penetrating laterally in one of said threads so as to locally split said thread in two thread halves; and
   a screw associated with said slot so as to be capable of locally drawing together or separating said two thread halves.

12. The valve according to claim 11 wherein:
   said slot divides in said cap a first section from a second section, said first section having said first thread half thereon and said second section having said second thread half thereon.

13. The valve according to claim 12 wherein:
   said screw has a screw head and a screw barrel with a threaded foot end;
   said screw head bears on a first of said two sections, and said first of said two sections and said slot are traversed by said screw barrel; and
   said second section has a threaded bore in which said threaded foot end is received, so that it is possible to draw together said two sections by screwing in said screw.

14. The valve according to claim 12 wherein:
   said screw has a threaded screw barrel and a foot end;
   a first of said two sections has a threaded through bore;
   said threaded screw barrel is screwed in said threaded through bore and traverses said slot; and
   said foot end bears on the second section, so that it is possible to separate said two sections by screwing in said screw.

15. The valve according to claim 10, wherein said spring means comprises at least one Belleville spring washer.

16. The valve according to claim 10, comprising a fluid operated piston assembly in said housing.

17. The valve according to claim 10, comprising two diametrically opposed lock means associated with said thread on said cap.

18. The valve according to claim 17, wherein said lock means comprises:
   two slots penetrating laterally in said thread of said cap at two diametrically opposed locations, so as to locally split said thread in two thread halves at each of said two diametrically opposed locations; and
   a screw associated with each of said two slots so as to be capable of locally drawing together or separating said two thread halves.

* * * * *

UNITED STATES PATENT AND TRADEMARK OFFICE
CERTIFICATE OF CORRECTION

PATENT NO. : 6,742,763 B2 Page 1 of 1
DATED : June 1, 2004
INVENTOR(S) : Kremer

It is certified that error appears in the above-identified patent and that said Letters Patent is hereby corrected as shown below:

Column 4,
Line 50, change "screw-screwing" to -- screwing --

Signed and Sealed this

Twentieth Day of July, 2004

JON W. DUDAS
*Acting Director of the United States Patent and Trademark Office*